(12) United States Patent
Canipe et al.

(10) Patent No.: US 8,985,557 B2
(45) Date of Patent: Mar. 24, 2015

(54) MOBILE COOLING DEVICE

(75) Inventors: Larry Canipe, Boca Raton, FL (US); Dale Raymond, Boca Raton, FL (US)

(73) Assignee: Breezer Holdings, LLC, Deerfield Beach, FL (US)

( * ) Notice: Subject to any disclaimer, the term of this patent is extended or adjusted under 35 U.S.C. 154(b) by 0 days.

(21) Appl. No.: 13/822,262

(22) PCT Filed: Jul. 20, 2012

(86) PCT No.: PCT/US2012/047543
§ 371 (c)(1),
(2), (4) Date: Mar. 5, 2014

(87) PCT Pub. No.: WO2013/013124
PCT Pub. Date: Jan. 24, 2013

(65) Prior Publication Data
US 2014/0165639 A1    Jun. 19, 2014

Related U.S. Application Data

(60) Provisional application No. 61/509,908, filed on Jul. 20, 2011.

(51) Int. Cl.
*B01F 3/04* (2006.01)
*F28C 3/08* (2006.01)
*F24F 5/00* (2006.01)
*F24F 6/12* (2006.01)
*F24F 6/00* (2006.01)

(52) U.S. Cl.
CPC ............... *F28C 3/08* (2013.01); *F24F 5/0035* (2013.01); *F24F 2221/125* (2013.01); *Y02B 30/545* (2013.01); *F24F 2006/008* (2013.01); *F24F 6/12* (2013.01)

USPC .......... 261/81; 261/78.2; 261/116; 261/119.1

(58) Field of Classification Search
USPC ................................ 261/81, 78.2, 116, 119.1
See application file for complete search history.

(56) References Cited

U.S. PATENT DOCUMENTS

| | | |
|---|---|---|
| 2,079,117 A | 5/1937 | Hays |
| 2,238,120 A | 4/1941 | Launder |
| 4,657,712 A | 4/1987 | Milbocker |
| 5,447,663 A | 9/1995 | Dix et al. |
| 5,956,964 A | 9/1999 | Wright |

(Continued)

FOREIGN PATENT DOCUMENTS

WO     WO0069569     11/2000

OTHER PUBLICATIONS

International Search Report and Written Opinion issued in PCT/US2012/047543, mailed Oct. 5, 2012, 12 pages.

(Continued)

*Primary Examiner* — Robert A Hopkins
(74) *Attorney, Agent, or Firm* — Faegre Baker Daniels LLP

(57) ABSTRACT

Provided herein are various mobile cooling devices. In some embodiments, a mobile cooling device provided herein includes a base comprising a reservoir and a lid; and a fan assembly dimensioned to fit within the base. In some embodiments, the fan assembly of a mobile cooling device can include a vent configured to divert a portion of airflow toward an electronic component attached to the base. In some embodiments, the electronic component is attached to the bottom of the base.

26 Claims, 15 Drawing Sheets

(56) References Cited

U.S. PATENT DOCUMENTS

| | | | |
|---|---|---|---|
| 6,086,053 A | 7/2000 | Natschke et al. | |
| 6,182,463 B1 | 2/2001 | Strussion et al. | |
| 6,237,896 B1 | 5/2001 | Hicks et al. | |
| 6,325,362 B1 | 12/2001 | Massey et al. | |
| 6,789,787 B2 | 9/2004 | Stutts | |
| 7,021,894 B2 | 4/2006 | Lopatinsky et al. | |
| 7,395,676 B2 * | 7/2008 | White | 62/310 |
| 7,547,364 B2 | 6/2009 | Polak | |
| 8,631,665 B1 * | 1/2014 | DeClementi | 62/314 |
| 2005/0109040 A1 * | 5/2005 | Hansen | 62/3.6 |
| 2007/0119187 A1 * | 5/2007 | Kitchens et al. | 62/3.6 |
| 2010/0226753 A1 | 9/2010 | Dyson et al. | |

OTHER PUBLICATIONS

Aquafog Turbo RSM, copyright 1997, Jaybird Manufacturing, Inc., downloaded from http://web.archive,org/web/19990421053744/ http://www.jaybird-mfg.com/rsm.html on Sep. 18, 2014, Internet Archive Wayback Machine, Apr. 21,1999, 2 pages.

Jaybird Product Catalog Cover 1998-99, Jaybird Manufacturing, Inc, http://www.jaybird-mfg.com, Internet Archive Wayback Machine, April 21, 1999, 2 Pages.

Jaybird Product Catalog Cover 2007, Jaybird Manufacturing, Inc, http://www.jaybird-mfg.com, Internet Archive Wayback Machine, Apr. 21, 1999, 3 pages.

\* cited by examiner

MOBILE COOLING DEVICE

CROSS-REFERENCE TO RELATED APPLICATION

This application is a U.S. national stage application of International Application No. PCT/US2012/047543, filed Jul. 20, 2012, which claims priority to Provisional Application No. 61/509,908, filed Jul. 20, 2011, and entitled "Mobile Cooling Device", both of which are herein incorporated by reference in their entireties for all purposes.

TECHNICAL FIELD

The embodiments disclosed herein related to various mobile cooling devices and methods for making mobile cooling devices. Certain embodiments include a water-injected cooling fan that is enclosable within a portable base.

SUMMARY

Provided herein are various mobile cooling devices. In some embodiments, a mobile cooling device provided herein includes a base comprising a reservoir and a lid; and a fan assembly dimensioned to fit within the base.

In some embodiments, the fan assembly of a mobile cooling device can include a vent configured to divert a portion of airflow toward an electronic component attached to the base. In some embodiments, the electronic component is attached to the bottom of the base.

In some embodiments, the fan assembly and reservoir of a provided cooling assembly can each comprise a body, the bodies being produced from single molded piece.

In some embodiments, a mobile cooling device provided herein can further include any one or more of an atomizer, a pump configured to deliver water from the reservoir to the atomizer, and an oscillation unit.

In some embodiments, a pump on a provided mobile cooling device can be configured to deliver water to the atomizer intermittently or by causing pulsating water flow (e.g., at an interval of from about 0.1 to about 1.5 seconds).

In some embodiments, a mobile cooling device can include a mounting assembly configured to attach the fan assembly to the base. The mounting assembly can be configured to telescope, rotate, conduct air flow to an electrical component, and/or enclose one or more wire. In some embodiments, a mobile cooling includes a mounting assembly that is configured to removably attach the fan assembly to the base. In other embodiments, a mobile cooling device includes a mounting assembly that is configured to remain attached to the fan assembly when the fan assembly is disposed within the base. A mounting assembly configured to remain attached to the fan assembly when the fan assembly is disposed within the base can include a joint or a pivoting gimbal.

Also provided herein is a mobile cooling device that includes a base comprising with a reservoir, a lid, wheels, and a well, the well located on the bottom of the base and housing an oscillation unit; a fan assembly dimensioned to fit within the base, the fan assembly comprising a body, a vent configured to divert a portion of airflow toward the well, and an air movement assembly mounted to the body, the air movement assembly comprising a fan motor operably connected to a fan blade assembly; and a mounting assembly operably connected to the oscillation unit and configured to removably attach the fan assembly to the base and to provide a lumen for airflow from the vent to the well.

A mobile cooling device provided herein can include an air straightening vane and/or an atomizer.

Provided herein are mobile cooling devices having any combination of the above features.

Further provided herein is a method for making a mobile cooling device. The method can include molding a single piece casing and cutting the casing to produce a reservoir component and a fan assembly component. The method can further include cutting the casing to produce a lid for the reservoir component. In some embodiments, the fan assembly component is dimensioned to fit within the reservoir component. In some embodiments, the fan assembly component can be enclosed within the reservoir component with a lid.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

DETAILED DESCRIPTION

Figure 1:
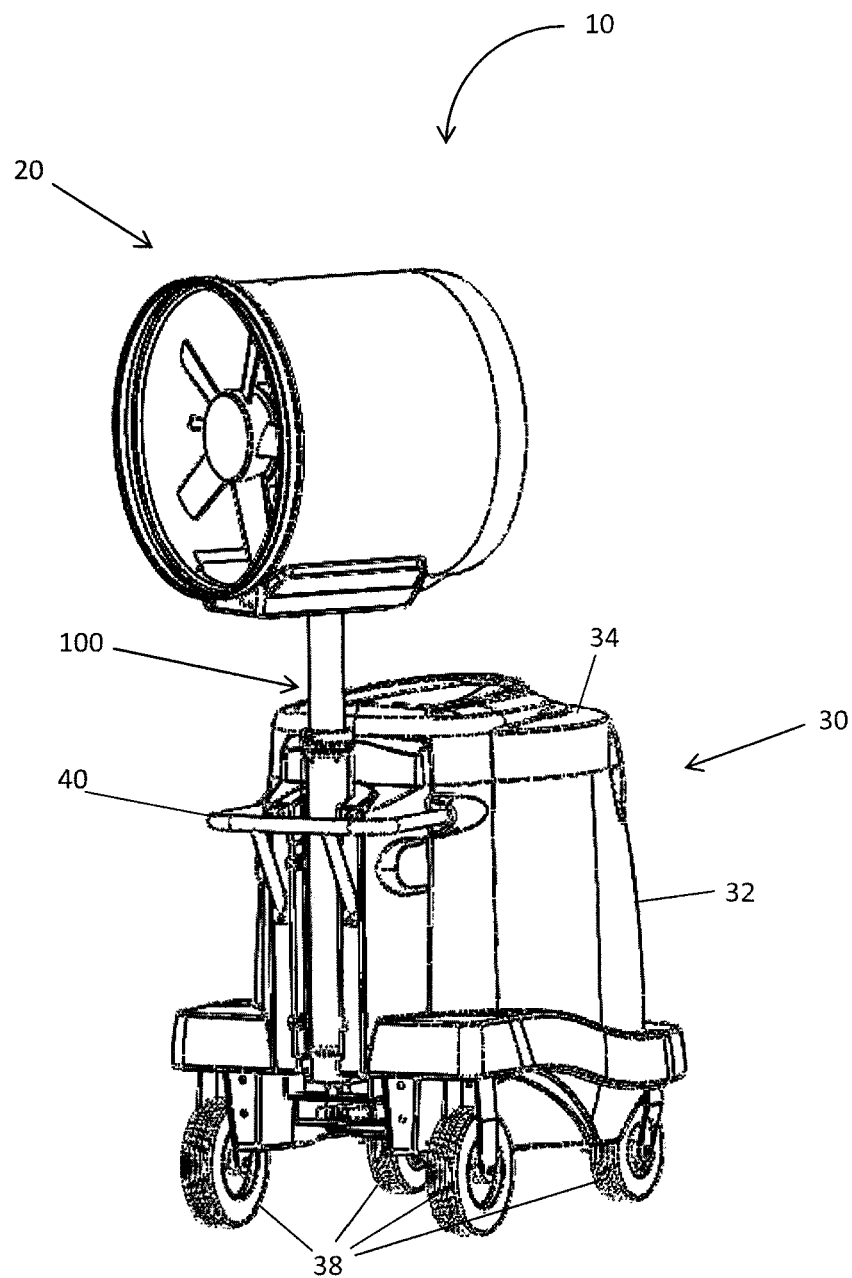
FIG. 1 is a back perspective view of a mobile cooling device, according to one embodiment.
Figure 2:
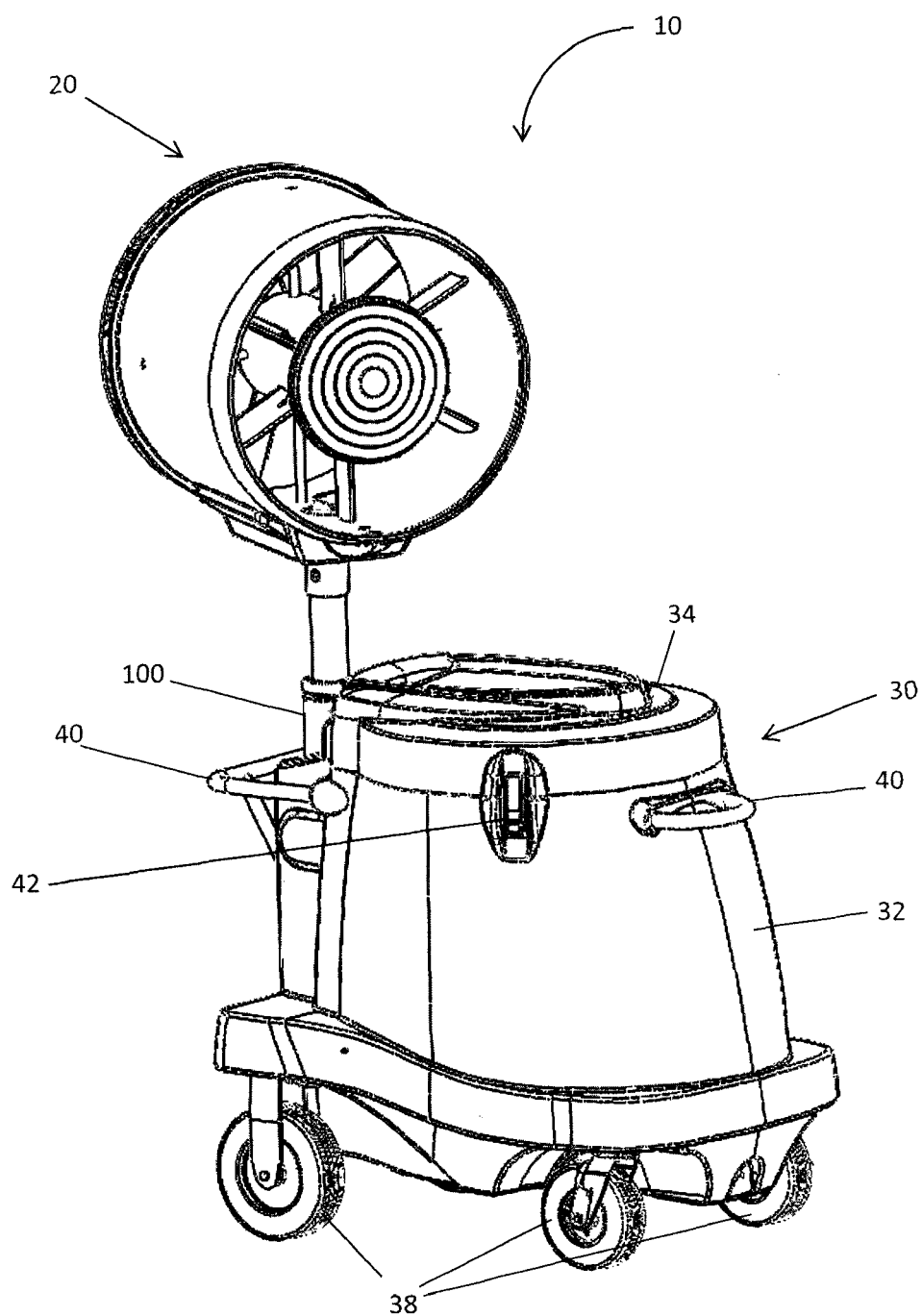
FIG. 2 is a front perspective view of the mobile cooling device shown in FIG. 1.

The various devices and methods disclosed herein relate to mobile cooling devices. More specifically, the various embodiments relate to mobile cooling devices that include a water-injected fan that is storable in a portable water reservoir. In one embodiment, as best shown in FIGS. 1 and 2, mobile cooling device 10 includes a fan assembly 20 that mounts to and fits within portable base 30. Portable base 30 comprises a reservoir 32 fitted with a lid 34 and wheels 38, and a mounting system 100 with which fan assembly 20 is mounted to the base 30. Lid 34 is removably attached to reservoir 32 using, for example, at least one latch 42. According to one implementation, the mobile cooling device 10 is assembled by affixing the mounting assembly 100 to base 30 using, for example, bolts or adhesive.

Figure 3:
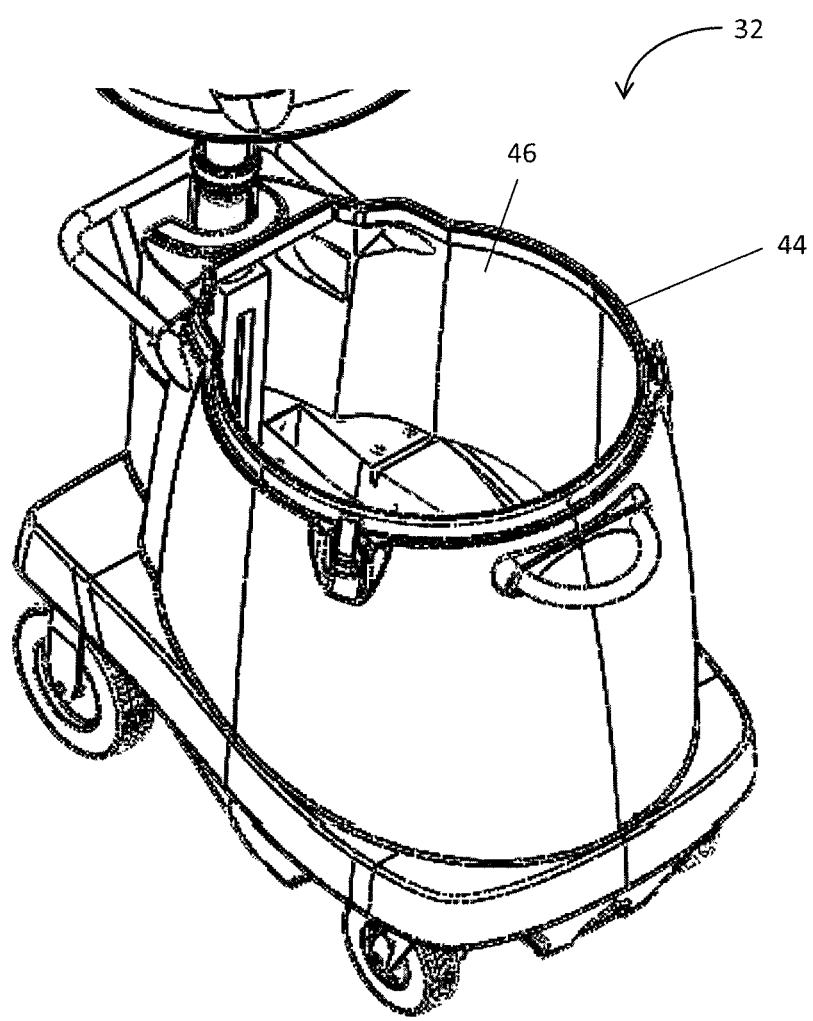
FIG. 3 is a top view of a reservoir for a mobile cooling device, according to one embodiment.
Figures 4A, 4B:
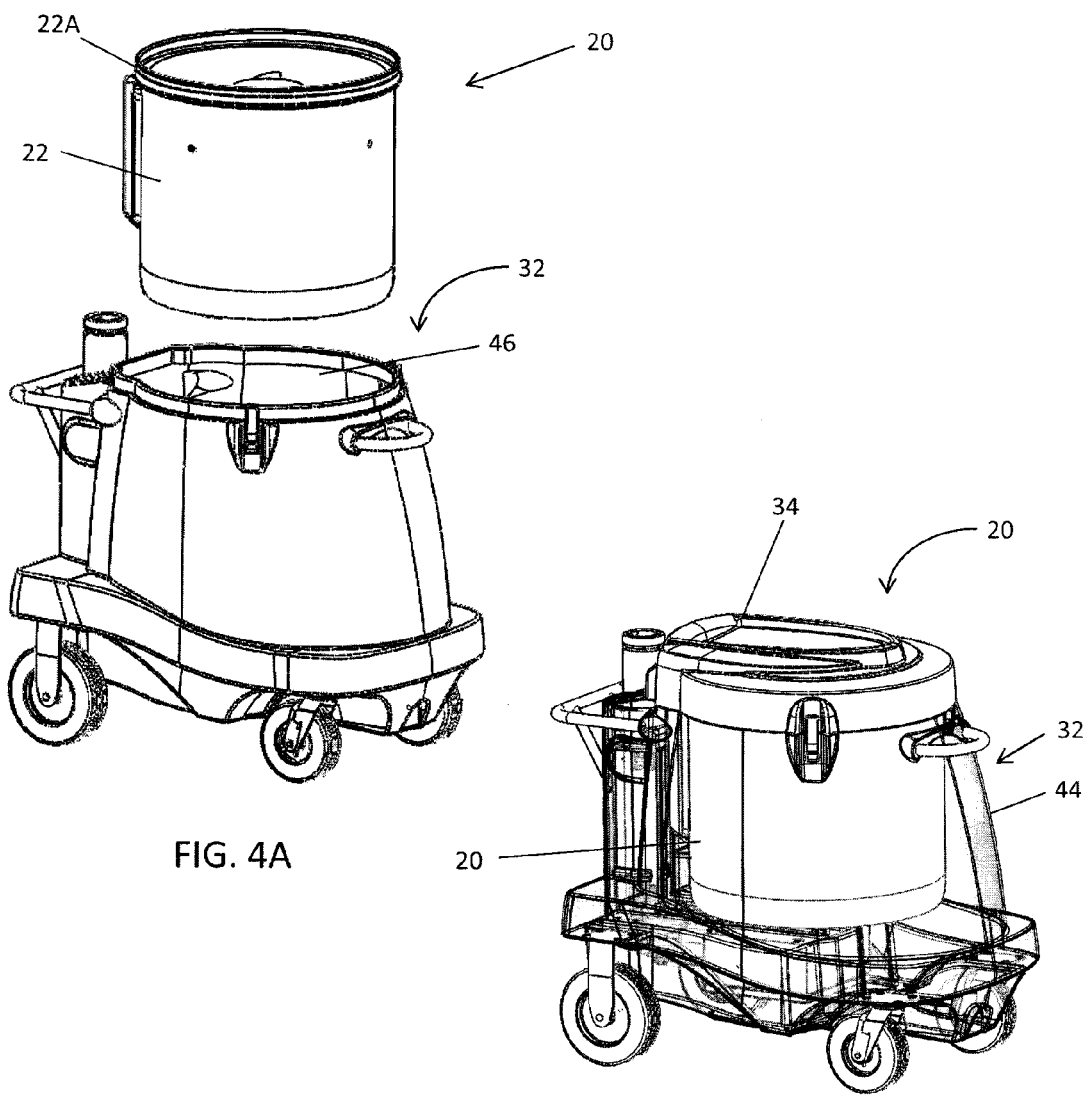
FIG. 4A is a perspective view of a disassembled mobile cooling device including a fan assembly and a base, according to one embodiment.
FIG. 4B is a perspective view of the mobile cooling device according to the embodiment of FIG. 4A, with a semi-transparent body, with the fan assembly stored in the base.

As best shown in FIG. 3, reservoir 32 includes a reservoir body 44 with an opening 46 at the top. As best shown in FIGS. 4A and 4B, fan assembly 20 comprises a body 22, which is dimensioned to fit through the opening 46 of reservoir 32 such that the fan assembly 20 is enclosed in the base 30 of the device 10 when the lid 34 is attached to the reservoir 32. In some embodiments, the body 22 of the fan assembly 20 includes a lip 22A that rests atop opening 46 to prevent fan assembly 20 from resting on the bottom of reservoir 32 and/or to facilitate removal of fan assembly 20 from base 30 for assembly. FIG. 4B depicts the base 30 with the body 44 shown semi-transparent to illustrate the fan assembly 20 enclosed within base 30.

In some embodiments, as shown in FIGS. 1 and 2, base 30 further includes wheels 38 and/or one or more handles 40 to increase portability. Wires from a power source or control panel can be permanently or removably attached to the fan assembly 20. In addition, any tubes for transporting water from the reservoir 32 can be permanently or removably attached to the atomizer 308. In some embodiments, the mounting assembly 100 can be attached to an oscillation unit. Optionally, additional components, such as wheels, a control panel, or handles, can be permanently or removably attached to the base 30.

Figure 5:
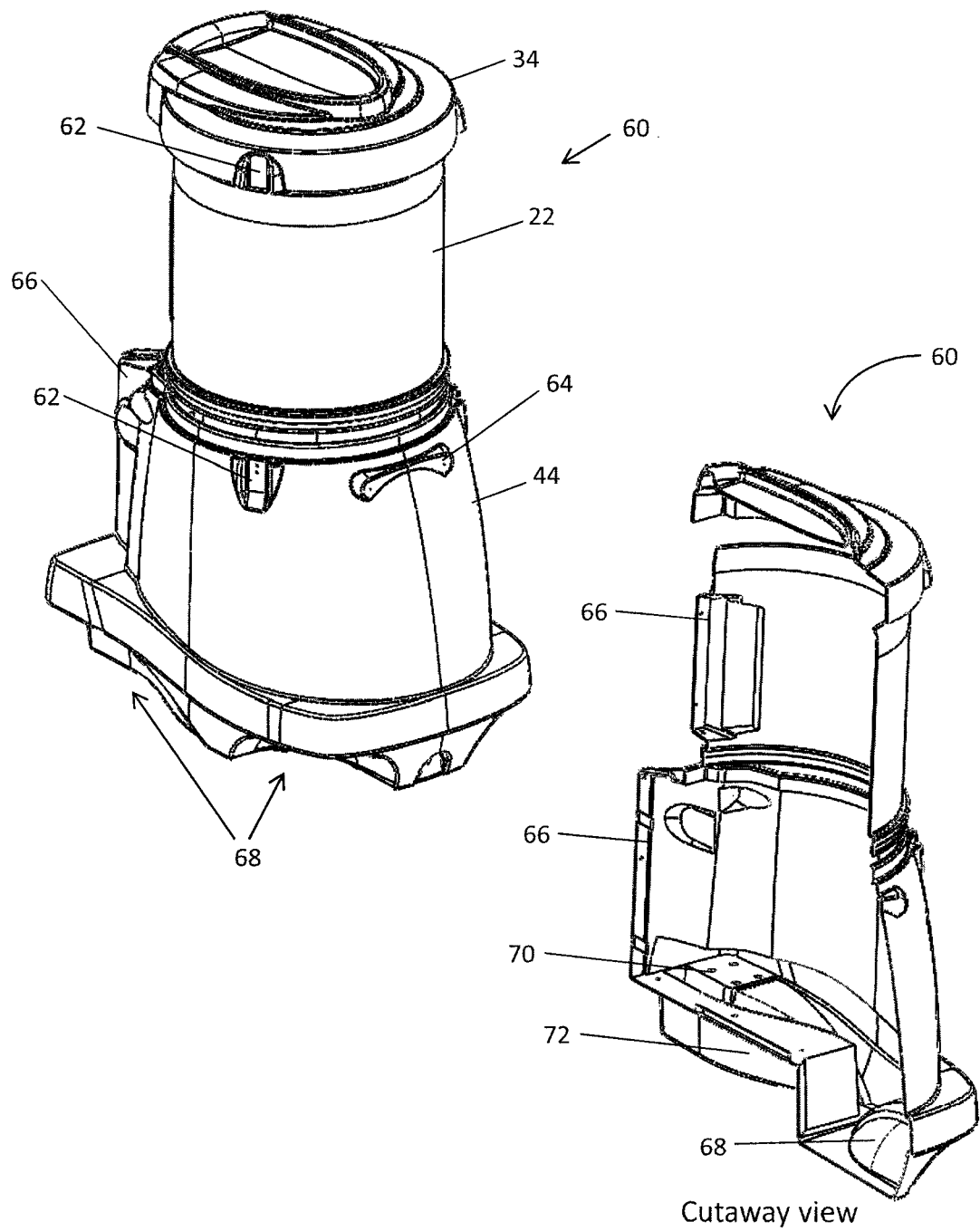
FIG. 5 is a perspective view and a cutaway view of a single piece casing for a mobile cooling device, according to one embodiment.
Figure 6:
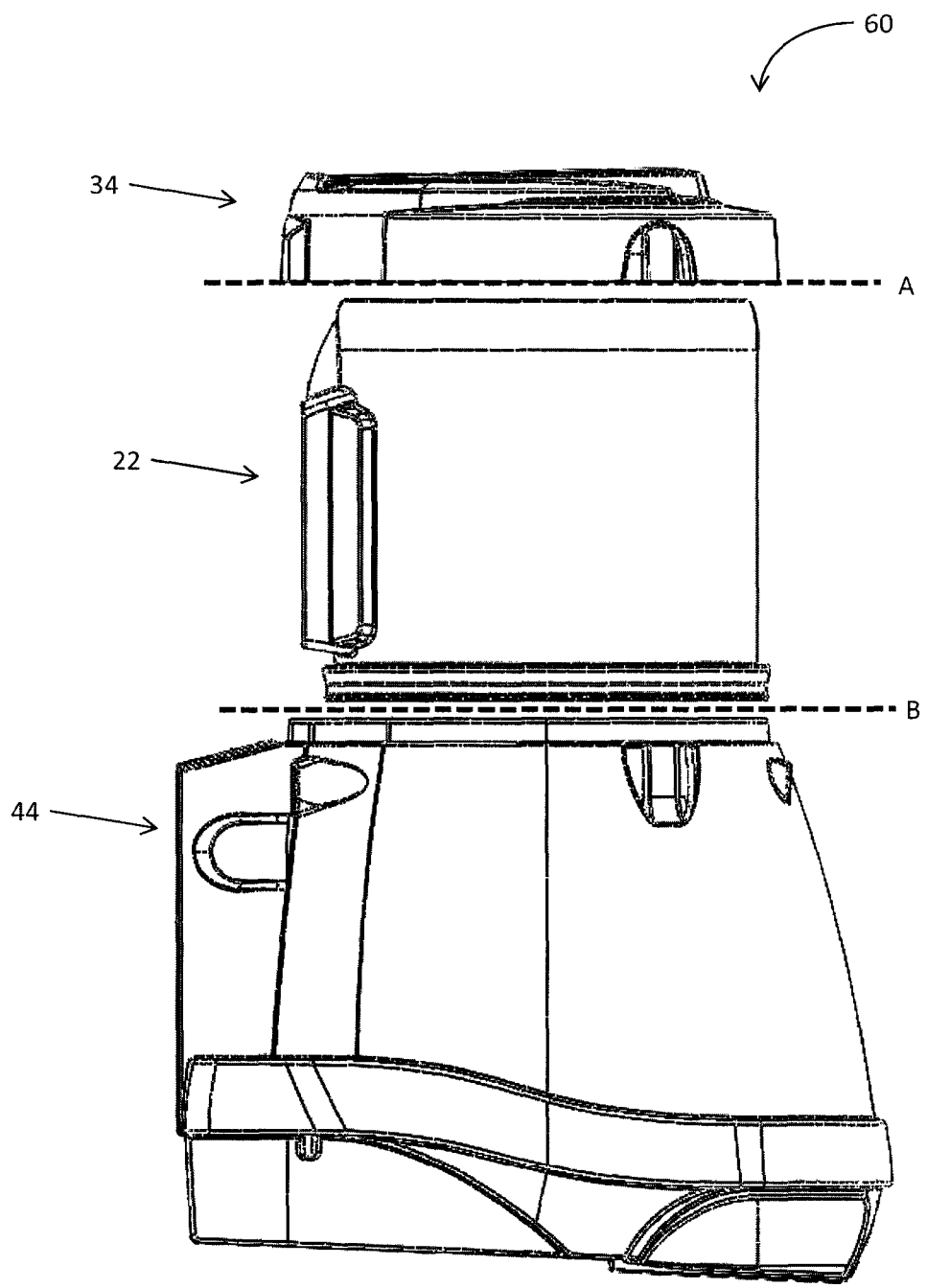
FIG. 6 is a side view of a single piece casing showing separation of individual component pieces, according to the embodiment in FIG. 5.

Various methods for manufacturing a mobile cooling device are also provided herein. For example, in one embodiment, as best shown in FIGS. 5 and 6, the body 44 of reservoir 32, the body 22 of fan assembly 20, and the lid 34 are molded as a single casing 60 and separated after molding. In this embodiment, casing 60 is made from a single cavity rotational mold and, as best shown in FIG. 6, separated at lines A and B to form separate bodies 44, 22, and the lid 34. In some embodiments, the casing 60 can include features for the addition of various components. For example, as best shown in FIG. 5, casing 60 can include a mount 62 for latch 42, a mount 64 for handle 40, a mount 66 for the mounting system 100, wheel wells 68 and mounts 70 (cutaway view) to accommodate wheels 38, and a well 72 (cutaway view) for housing one or more electronic component. In some embodiments, the casing 60 can include features useful for protecting wires or restricting wire movement (i.e., wire management) for wires that connect electronic components to the fan assembly 20. Similarly, in some embodiments, the casing 60 can include features useful for protecting tubing or restricting tubing movement for tubing that connects reservoir 32 to the fan assembly 20. In some embodiments, the casing 60 can include features for storing additional components.

Figure 7:
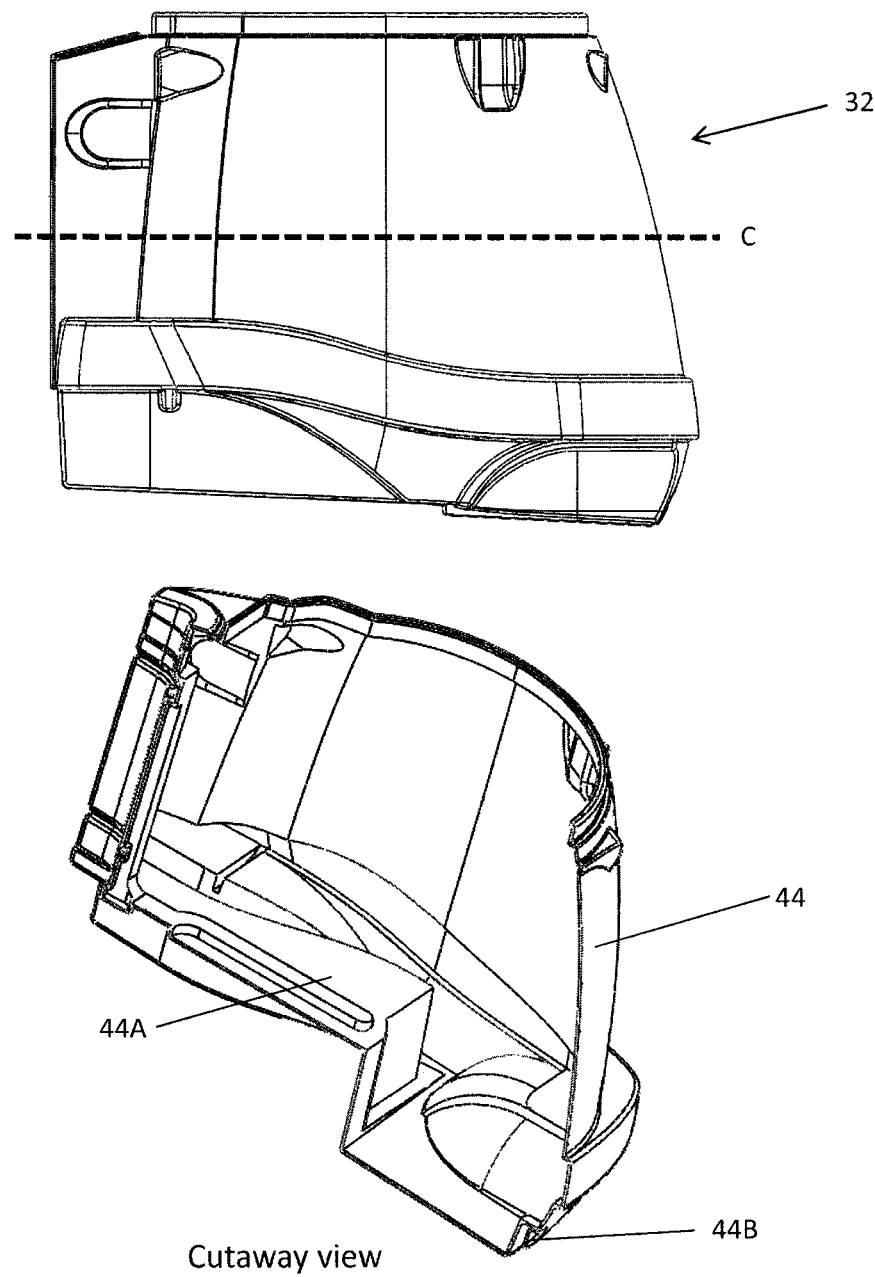
FIG. 7 is a side view and a cutaway view of a reservoir for a mobile cooling device, according to one embodiment.

In some embodiments, as best shown in FIG. 7, the reservoir body 44 can be configured to increase the efficiency of drainage. For example, when the reservoir 32 is placed on a level surface parallel with line C, the surfaces on the floor 44A (cutaway view) inside the reservoir 32 can slope downward toward a hole 44B (cutaway view) for drainage. Drying of the interior of the reservoir 32 can be facilitated by removing the lid 34 once water is drained through hole 44B.

Figure 8:
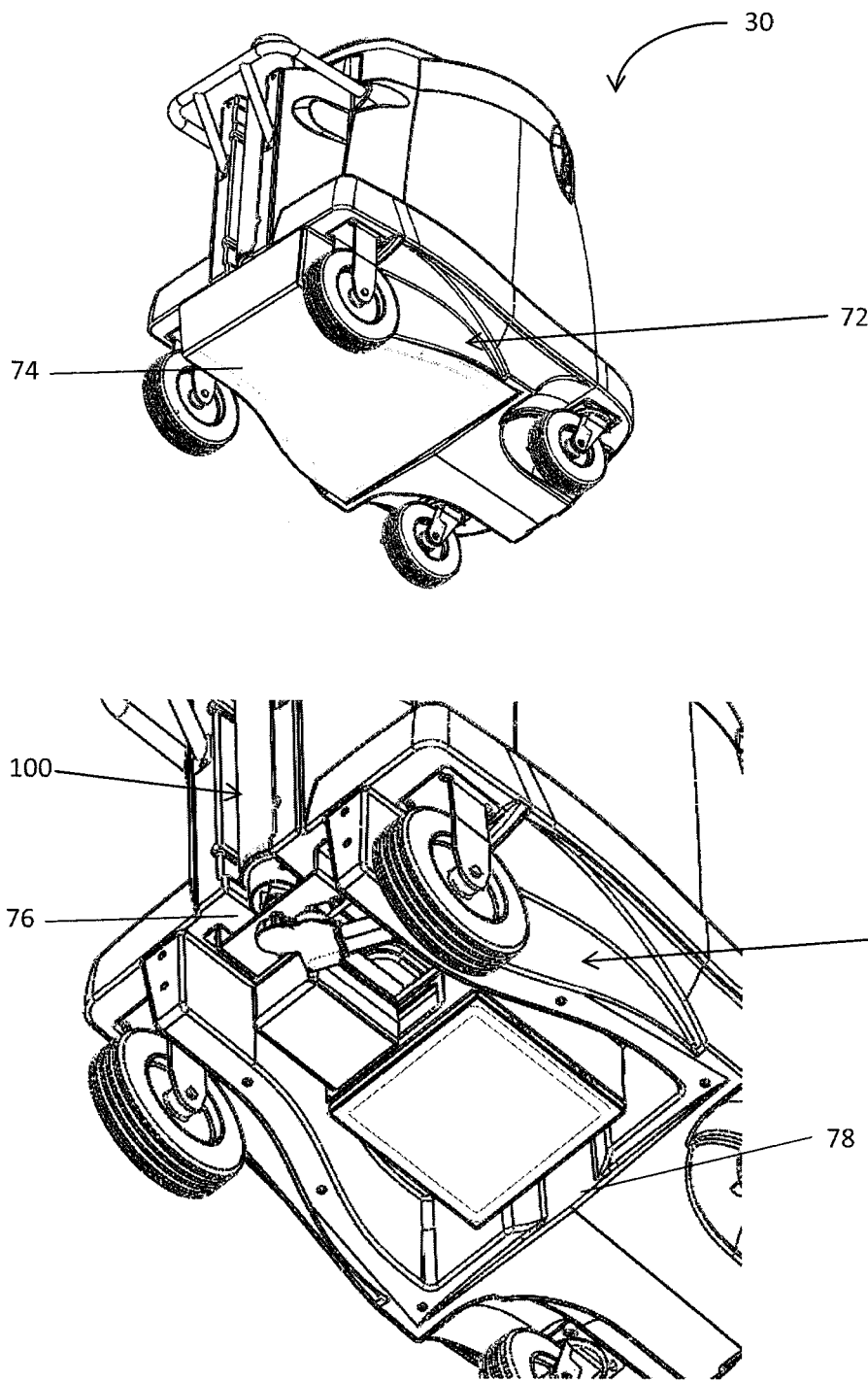
FIG. 8 is a bottom perspective view of a base for a mobile cooling device with (top) and without (bottom) a cover for an electronic housing well, according to one embodiment.
Figure 15:
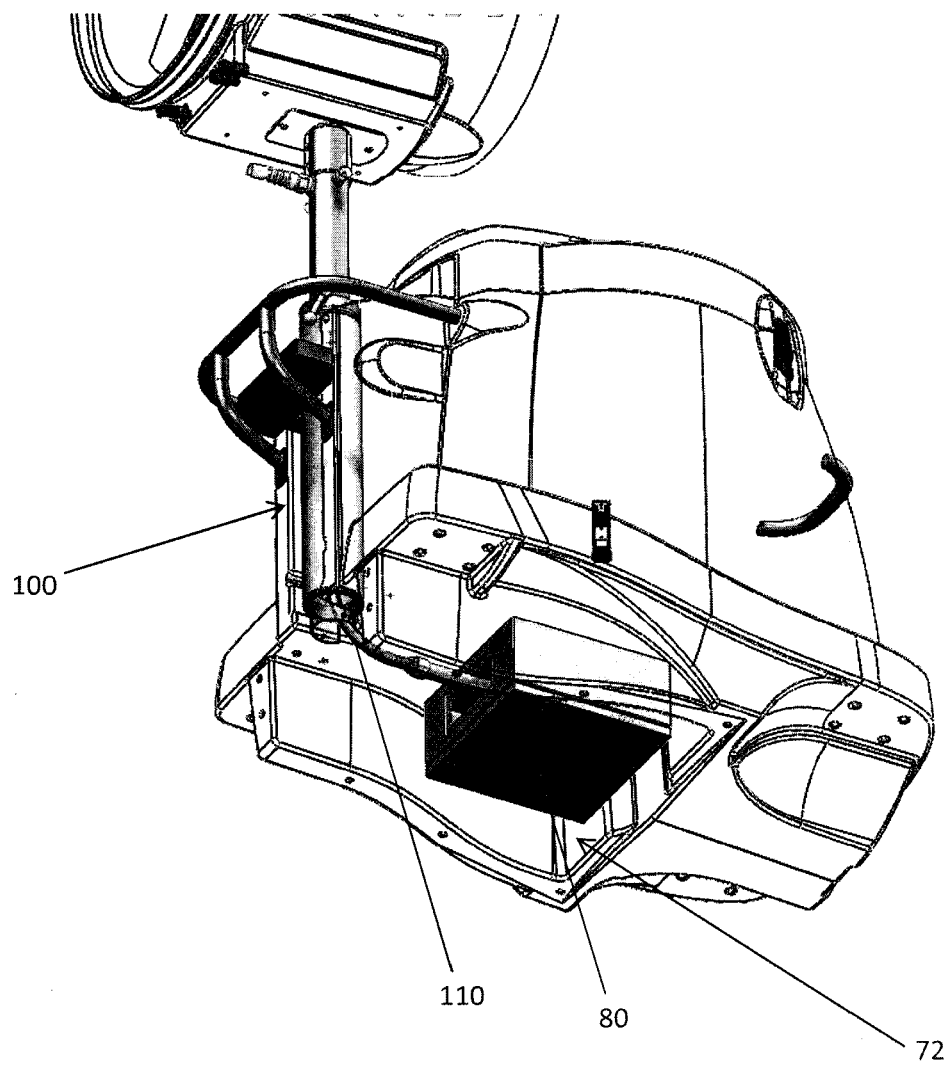
FIG. 15 is a close up bottom perspective view of a mobile cooling device showing some components as semi-transparent, according to one embodiment.

In the embodiment depicted in FIGS. 5 and 8, the electronic housing well 72 is located on the bottom of base 30 to protect electronic components from heat, such as radiant heat from the sun, as well as impact. Electronic housing well 72 can be enclosed by the addition of a cover 74. In some embodiments, as best shown in FIG. 15, electronic housing well 72 can enclose an electronic housing 80 that further encloses electronic components. Electronic housing well 72 can further include an air intake opening 76 and vent 78 to allow air flow through the enclosed well 72 to keep electronic components cool.

Figure 9:
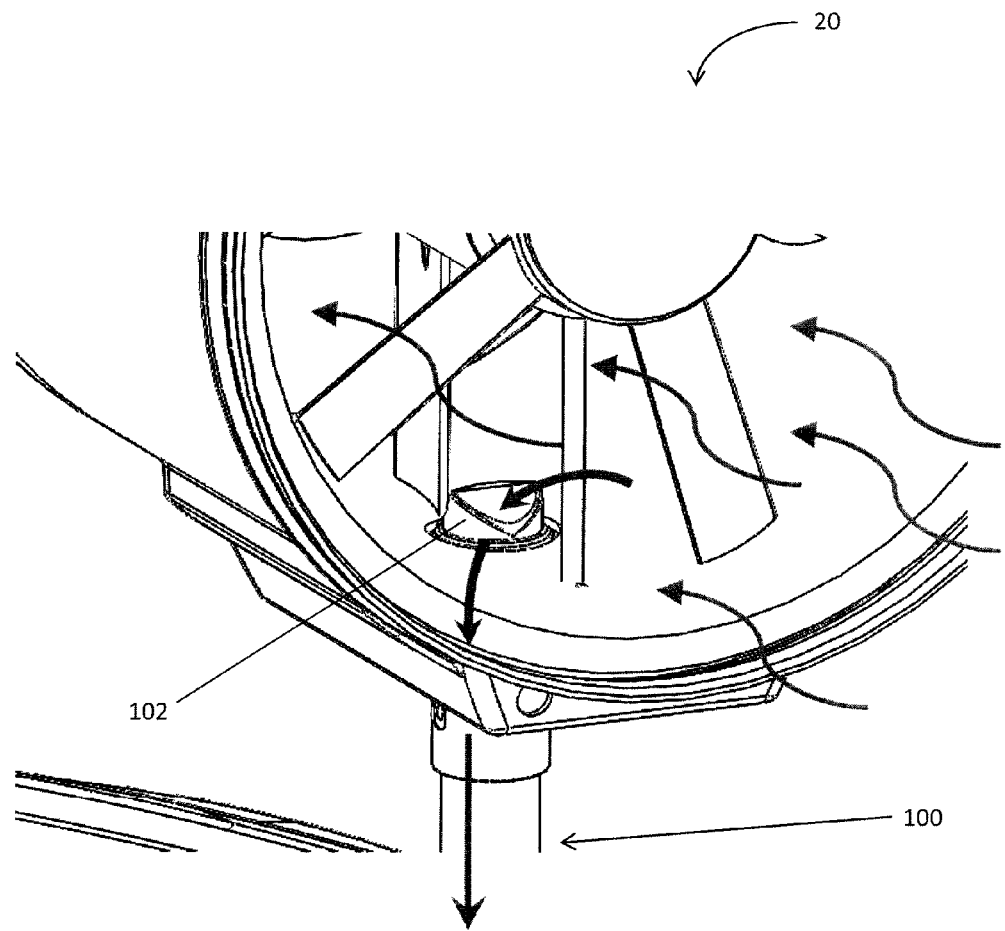
FIG. 9 is a close up view of a portion of a fan assembly and mounting assembly for a mobile cooling device, according to one embodiment.
Figure 10:
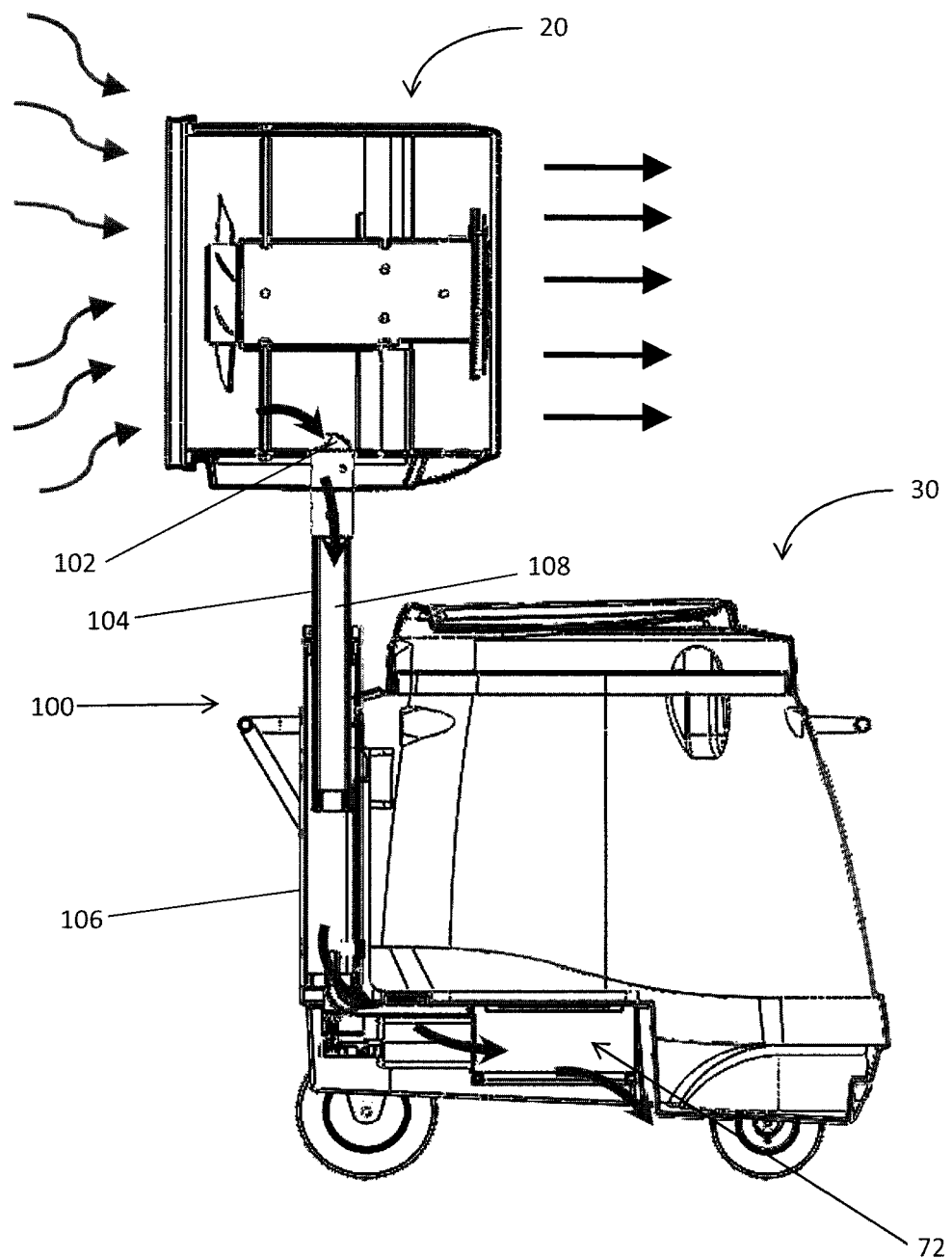
FIG. 10 is a side view of a mobile cooling device, according to one embodiment, showing some cutaway portions and air flow.

In the embodiment shown in FIG. 8, air intake 76 is positioned adjacent to the mounting system 100, to receive air flow from an air vent 102 in the fan assembly 20 that, when assembled, directs a portion of the air flow through fan assembly 20 down through mounting system 100, as best shown in FIGS. 9 and 10.

As best shown in FIG. 10, mounting assembly 100 comprises a hollow tube 104 slidably mounted within hollow shaft 106, such that tube 104 can telescope upward from shaft 106 to provide an adjustable elevated mounting structure for fan assembly 20 and a continuous lumen 108 for airflow through the mounting assembly 100 from vent 102 to electronic housing well 72. Shaft 106 is secured to base 30 via mount 66 (FIG. 5) such that shaft 106 opens to intake 76 of electronic housing well 72.

In some embodiments, the mounting assembly 100 provides wire management for wires that connect electronic components in the electronic housing well 72 to the fan assembly 20 or the base 30. As best shown in FIG. 15, the mounting assembly 100 can include a conduit 110 to house wiring within the lumen 108 used for airflow or it can include a separate lumen (not shown). Alternatively, features (not shown) can be included on the exterior of the mounting assembly 100 to provide wire management. The mounting assembly 100 can be similarly configured to house tubing (not shown).

In some embodiments, the mounting assembly 100 is jointed or includes a pivoting gimbal configured to allow storage of the fan assembly 20 in base 30, while the mounting assembly 100 is still attached to the fan assembly 20 and base 30. In this embodiment, base 30 or lid 34 may include structural features, such as a hole or a notch to allow a portion of the mounting assembly 100 to extend within the base 30 while the fan assembly 20 is stored within the base 30.

Figure 11:
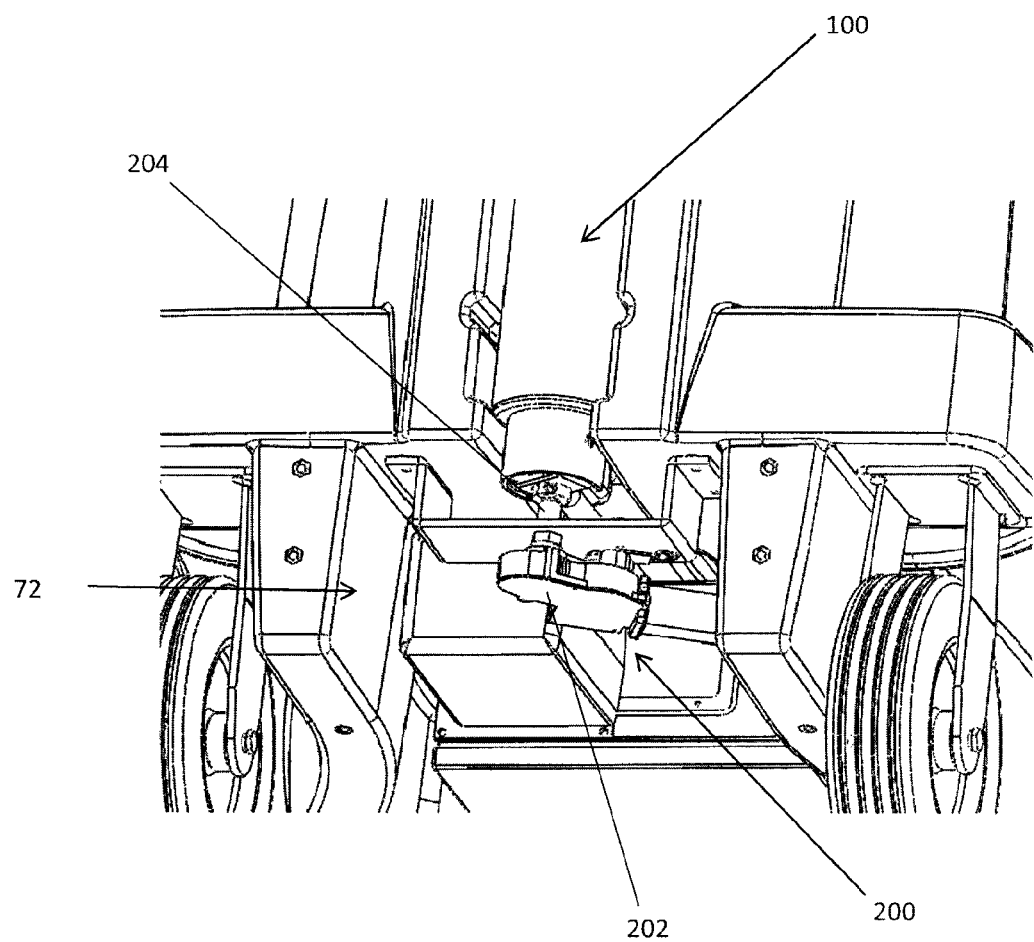
FIG. 11 is a close up view of a portion of a mobile cooling device showing an oscillation unit, according to one embodiment.
Figure 12:
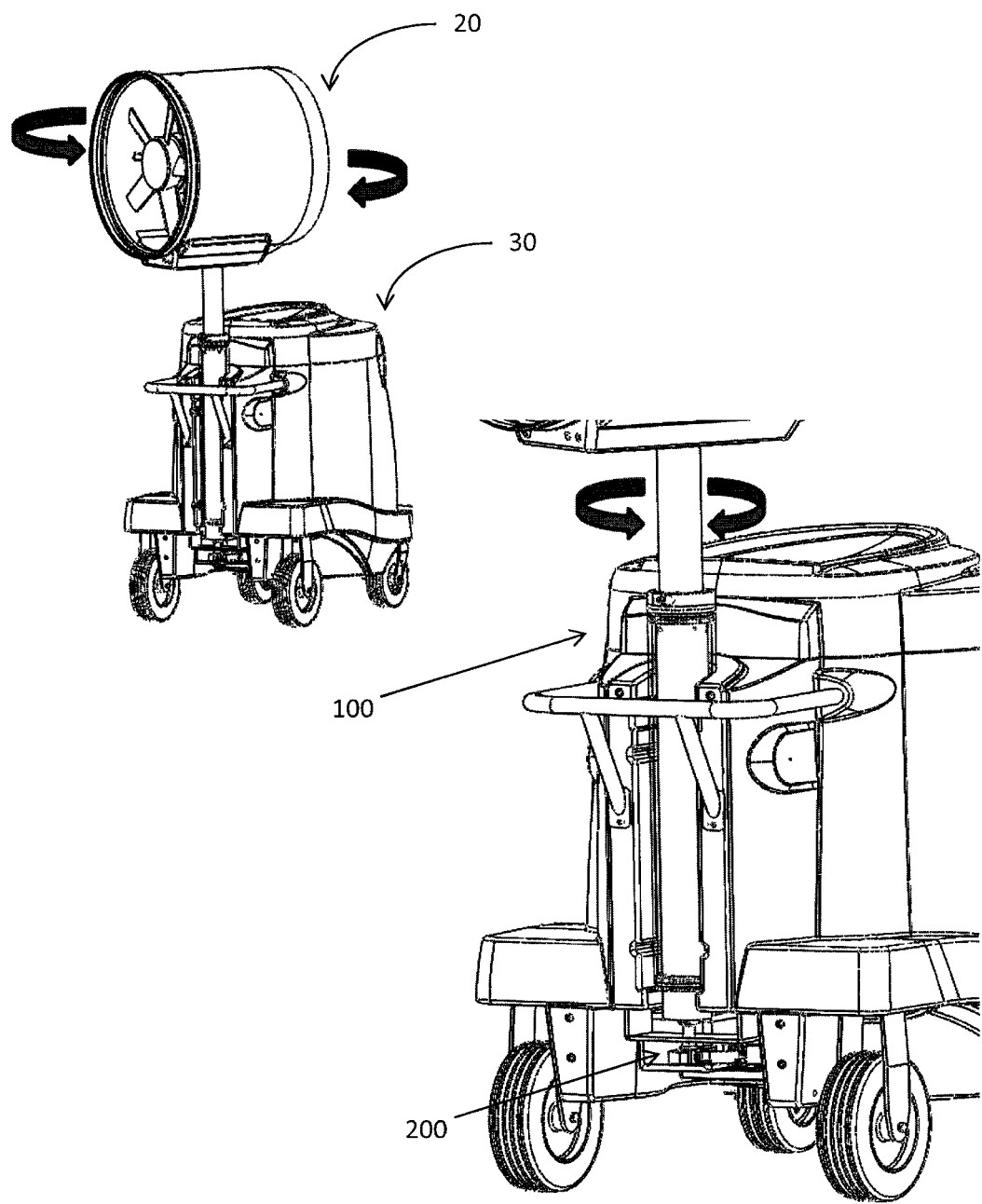
FIG. 12 is a perspective view and a close up view of a mobile cooling device, according to the embodiment of FIG. 11.

In some embodiments, as best shown in FIG. 11, the mounting assembly 100 is operably coupled to an oscillation unit 200. Oscillation unit 200 comprises oscillation motor 202 housed within the electronic housing well and oscillation drive shaft 204 coupled to the motor 202 and mounting assembly 100, such that actuation of motor 202 translates to oscillation motion, depicted with curved arrows, of the fan assembly 20, as best shown in FIG. 12. It is understood that any known oscillation unit can be used.

Figure 13:
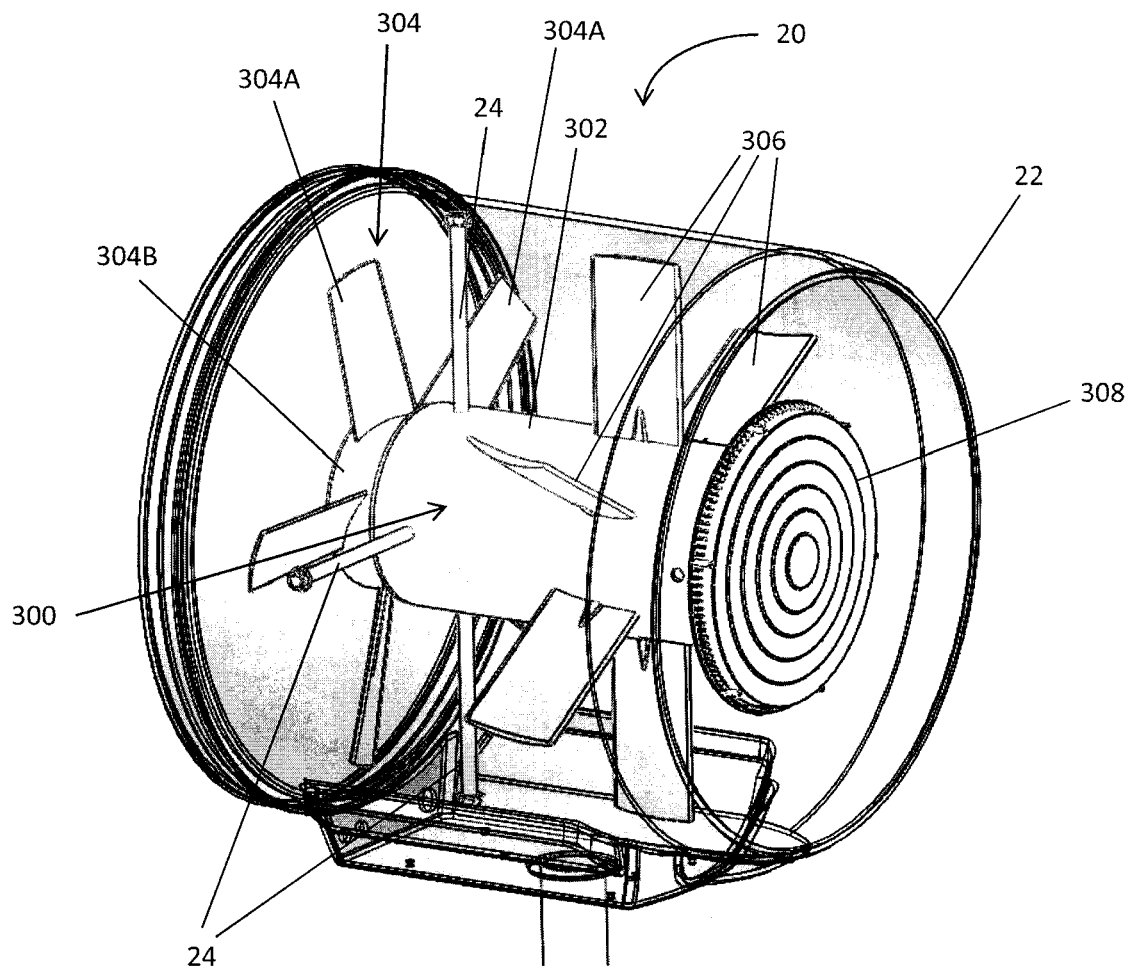
FIG. 13 is a perspective view of a fan assembly for a mobile cooling device with the exterior shown as semi-transparent, according to one embodiment.
Figure 14:
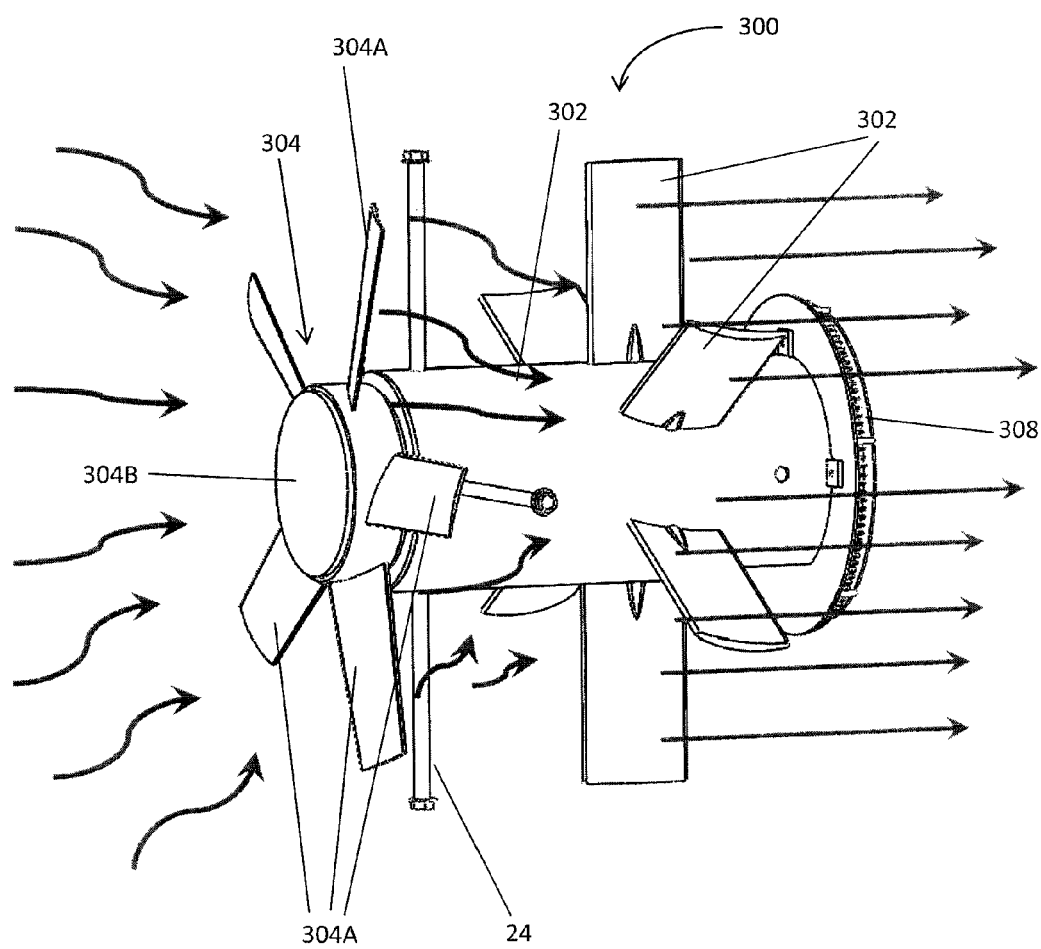
FIG. 14 is a close up view of components of a fan assembly for the mobile cooling device shown in FIG. 13, showing air flow.

As best shown in FIGS. 13 and 14, fan assembly 20 comprises the fan assembly body 22 and an air movement assembly 300 mounted to the body 22 (shown as semi-transparent) via mounts 24. The air movement assembly 300 comprises a fan motor (not shown) housed in housing 302, fan blade assembly 304 operably connected to the fan motor at the back of the air movement assembly 300, air straightening vanes 306 mounted to the housing 302 forward of the fan blade assembly 304, and atomizer 308 mounted to the front of the air movement assembly 300. Fan blade assembly 304 includes fan blades 304A mounted to a hub 304B such that rotation of the fan blade assembly 304 directs air from the back of the fan assembly 300 toward the front of the fan assembly 300. In use, as best shown in FIG. 14, the fan motor rotates fan blade assembly 304 to direct air into the fan assembly 20 toward vent 102 and air straightening vanes 306, where turbulent air (depicted by wavy arrows) is "straightened" to produce substantially laminar flow (depicted by straight arrows). The straightened air is then directed past the atomizer 308 where mist is introduced and directed outward from the fan assembly 20. Water from reservoir 32 is delivered to the atomizer 308 to produce mist using any appropriate means, such as a pump and tubing (not shown). In some embodiments, the mobile cooling device includes one or more filters (not shown) to prevent particulates from being carried to the atomizer 308.

Optionally, mobile cooling device 10 can include additional components, such as a control panel for controlling fan motor speed, fan assembly oscillation, and/or water flow to the atomizer. Such controls can provide for various levels of control of the fan speed and direction, as well as water delivery, including, for example, fixed or variable fan speed, fixed or variable air flow direction, fixed or variable oscillation speed and/or degree of rotation, water delivery rate, or intermittent or pulsed operation of the fan motor and/or water delivery (e.g., at intervals of from about 0.1 seconds to about 1.5 seconds, about 0.1 seconds to about 0.5 seconds, about 0.5 seconds to about 1.5 seconds, about 0.25 seconds to about 1 second, or about 1 second to about 5 seconds).

Tube 104 is telescoped upward from shaft 106 such that the top of tube 104 extends above the top of base 30. Tube 104 can be locked in a telescoped position using any appropriate method. For example, shaft 106 can comprise a hole through which a thumb screw can be tightened against tube 104 or the top of shaft 106 can be tightened against tube 104 using a twist lock. Once the mounting assembly 100 is telescoped and locked, fan assembly 20 is connected to tube 104 such that vent 102 forms a continuous lumen 108 for airflow through the mounting assembly 100 from vent 102 to the opening at the bottom of shaft 106.

For storage, any water held in reservoir 32 is removed by opening hole 44B to allow the water to flow out and/or removing lid 34 to allow for evaporation. In some embodiments, the fan assembly 20 is removed from mounting assembly 100 and inserted into the reservoir 32. Alternatively, the fan assembly 20 remains attached to the mounting assembly 100 and the mounting assembly is positioned such that fan assembly 20 is positioned within the reservoir 32. The lid 34 is then placed over the opening 46 of the reservoir 32, and optionally, locked into place using, for example, a latch 42. In some embodiments, the tube 104 of the mounting assembly 100 can be refracted into shaft 106. Alternatively, or in addition, the mounting assembly 100 can be removed, as can any attached wheels, handles, or other components attached to the base.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

What is claimed is:

1. A mobile cooling device comprising:

a base comprising a reservoir and a lid; and a fan assembly dimensioned to fit within the base and comprising a vent configured to divert a portion of airflow toward an electronic component attached to the base.

2. The mobile cooling device of claim 1, wherein the fan assembly and reservoir each comprise a body, the bodies being produced from single molded piece.

3. The mobile cooling device of claim 1, wherein the fan assembly further comprises an atomizer.

4. The mobile cooling device of claim 3, further comprising a pump configured to deliver water from the reservoir to the atomizer.

5. The mobile cooling device of claim 4, wherein the pump is configured to deliver water to the atomizer intermittently or by causing pulsating water flow.

6. The mobile cooling device of claim 5, wherein the pump is configured to deliver water to the atomizer at an interval of from about 0.1 to about 1.5 seconds.

7. The mobile cooling device of claim 1, further comprising an oscillation unit attached to the base.

8. The mobile cooling device of claim 1, wherein the electronic component is attached to the bottom of the base.

9. The mobile cooling device of claim 1, further comprising a mounting assembly configured to attach the fan assembly to the base.

10. The mobile cooling device of claim 9, wherein the mounting assembly is configured to telescope.

11. The mobile cooling device of claim 9, wherein the mounting assembly is configured to rotate.

12. The mobile cooling device of claim 9, wherein the mounting assembly is configured to conduct air flow to an electrical component.

13. The mobile cooling device of claim 9, wherein the mounting assembly is configured to enclose one or more wire.

14. The mobile cooling device of claim 9, wherein the mounting assembly is configured to removably attach the fan assembly to the base.

15. The mobile cooling device of claim 9, wherein the mounting assembly is configured to remain attached to the fan assembly when the fan assembly is disposed within the base.

16. The mobile cooling device of claim 15, wherein the mounting assembly comprises a joint.

17. The mobile cooling device of claim 15, wherein the mounting assembly comprises a pivoting gimbal.

18. A mobile cooling device comprising:

a base comprising a reservoir, a lid, wheels, and a well, the well located on the bottom of the base and housing an oscillation unit;

a fan assembly dimensioned to fit within the base, the fan assembly comprising a body, a vent configured to divert a portion of airflow toward the well, and an air movement assembly mounted to the body, the air movement assembly comprising a fan motor operably connected to a fan blade assembly; and a mounting assembly operably connected to the oscillation unit and configured to removably attach the fan assembly to the base and to provide a lumen for airflow from the vent to the well.

19. The mobile cooling device of claim 18, wherein the fan assembly further comprises an air straightening vane.

20. The mobile cooling device of claim 18, wherein the fan assembly further comprises an atomizer.

21. A method for making a mobile cooling device comprising:

molding a single piece casing; and cutting the casing to produce a reservoir component and a fan assembly component.

22. The method of claim 21, wherein cutting the casing further comprises cutting the casing to produce the reservoir component, the fan assembly component, and a lid for the reservoir component.

23. The method of claim 21, wherein the fan assembly component is dimensioned to fit within the reservoir component.

24. The method of claim 23, wherein the fan assembly component can be enclosed within the reservoir component with a lid.

25. The mobile cooling device of claim 8, wherein the electronic component is located within a well at the bottom of the base.

26. The mobile cooling device of claim 18, further comprising an electronic component in the well.

* * * * *